United States Patent
Trichopoulos et al.

(10) Patent No.: US 11,006,383 B2
(45) Date of Patent: May 11, 2021

(54) MAPPING AND LOCALIZATION USING IMAGE PROCESSING OF WIRELESS SIGNALS

(71) Applicants: Georgios Trichopoulos, Tempe, AZ (US); Ahmed Alkhateeb, Chandler, AZ (US)

(72) Inventors: Georgios Trichopoulos, Tempe, AZ (US); Ahmed Alkhateeb, Chandler, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/684,746

(22) Filed: Nov. 15, 2019

(65) Prior Publication Data

US 2020/0163040 A1 May 21, 2020

Related U.S. Application Data

(60) Provisional application No. 62/767,820, filed on Nov. 15, 2018.

(51) Int. Cl.
*H04W 64/00* (2009.01)
*G01S 5/02* (2010.01)
(Continued)

(52) U.S. Cl.
CPC .......... *H04W 64/00* (2013.01); *G01S 5/0215* (2013.01); *G01S 5/0273* (2013.01); *G01S 5/06* (2013.01);
(Continued)

(58) Field of Classification Search
CPC combination set(s) only.
See application file for complete search history.

(56) References Cited

U.S. PATENT DOCUMENTS 7,920,069 B2 * 4/2011 Shain et al. ............... 340/815.4
9,453,905 B2 * 9/2016 Smith ................... G01S 5/0273
(Continued)

FOREIGN PATENT DOCUMENTS

WO 2017216745 A1 12/2017

OTHER PUBLICATIONS

Challa, S., et al., "Simultaneous Localization and Mapping in Wireless Sensor Networks," 2005 International Conference on Intelligent Sensors, Sensor Networks and Information Processing, Dec. 2005, IEEE, pp. 81-87.
(Continued)

*Primary Examiner* — Meless N Zewdu
(74) *Attorney, Agent, or Firm* — Withrow & Terranova, P.L.L.C.

(57) ABSTRACT

Mapping and localization using image processing of wireless signals is provided. Embodiments of the present disclosure provide a novel approach for high accuracy mapping of an environment around an antenna (or antenna array) coupled to a radio frequency (RF) transceiver through image processing of RF signals. The image processing includes constructing a map of line-of-sight (LOS) and non-line-of-sight (NLOS) objects in the environment by distinguishing NLOS objects and correctly projecting their positions relative to the LOS objects. In some examples, a three-dimensional (3D) image of the environment around the antenna (or antenna array) is produced. Aspects disclosed herein can further provide simultaneous localization and mapping (SLAM) for a wireless device.

20 Claims, 9 Drawing Sheets

(51) Int. Cl.
  H04B 7/0413 (2017.01)
  H04B 3/52 (2006.01)
  G01S 5/06 (2006.01)
  G01S 5/14 (2006.01)
  H04B 7/06 (2006.01)
(52) U.S. Cl.
  CPC .............. *G01S 5/14* (2013.01); *H04B 3/52* (2013.01); *H04B 7/0413* (2013.01); *H04B 7/0617* (2013.01)

(56) References Cited

U.S. PATENT DOCUMENTS

| | | | | |
|---|---|---|---|---|
| 10,395,539 | B2* | 8/2019 | Slutski et al. | G08G 1/166 |
| 10,469,619 | B2* | 11/2019 | Shimizu et al. | H04L 67/327 |
| 2007/0198227 | A1* | 8/2007 | Dundar et al. | 702/189 |
| 2013/0194127 | A1* | 8/2013 | Ishihara et al. | 342/70 |
| 2015/0111597 | A1* | 4/2015 | Lavery | H04W 4/043 |
| 2016/0146945 | A1* | 5/2016 | Kamijo et al. | G01S 19/22 |
| 2017/0006436 | A1* | 1/2017 | Ahmed et al. | H04W 4/043 |
| 2017/0255360 | A1* | 9/2017 | Hsieh et al. | G06F 3/04817 |
| 2017/0287334 | A1* | 10/2017 | Slutsky et al. | G06G 1/166 |
| 2019/0101638 | A1* | 4/2019 | Vu et al. | G01S 13/89 |
| 2019/0318146 | A1 | 10/2019 | Trichopoulos et al. | |
| 2020/0005385 | A1* | 1/2020 | Stout et al. | G06Q 30/0639 |
| 2020/0005911 | A1* | 1/2020 | Rapport | G01S 13/89 |
| 2020/0025911 | A1* | 1/2020 | Rappaport | G01S 13/89 |
| 2020/0132826 | A1* | 4/2020 | Achour | G01S 13/538 |

OTHER PUBLICATIONS

Chi, T., et al., "A Packaged 90-to-300 GHz Transmitter and 115-to-325GHz Coherent Receiver in CMOS for Full-Band Continuous-Wave mm-Wave Hyperspectral Imaging," 2017 IEEE International Solid-State Circuits Conference (ISSCC), Feb. 2017, IEEE, 3 pages.
Doddalla, S. K., et al., "Non-Line of Sight Terahertz imaging from a Single Viewpoint," 2018 IEEE/MTT-S International Microwave Symposium-IMS, Jun. 2018, IEEE, pp. 1527-1529.
Dumont, T., et al., "Simultaneous localization and mapping in wireless sensor networks," Signal Processing, vol. 101, Aug. 2014, Elsevier B.V., pp. 192-203, [Online] Available: http://www.sciencedirect.com/science/article/pii/S0165168414000814.
Durrant-Whyte, H., et al., "Simultaneous Localization and Mapping: Part I," IEEE Robotics & Automation Magazine, vol. 13, No. 2, Jun. 2006, IEEE, pp. 99-108.
Guidi, F., et al., "Personal Mobile Radars with Millimeter-Wave Massive Arrays for Indoor Mapping," IEEE Transactions on Mobile Computing, vol. 15, No. 6, Jun. 2016, IEEE, pp. 1471-1484.
Kanhere, O., et al., "Map-Assisted Millimeter Wave Localization for Accurate Position Location," 2019 IEEE Global Communications Conference, Dec. 2019, IEEE, pp. 1-6.
Kanhere, O., et al., "Position Locationing for Millimeter Wave Systems," 2018 IEEE Global Communications Conference, Dec. 2018, pp. 1-6.
Lemic, F., et al., "Localization as a Feature of mmWave Communication," 2016 International Wireless Communications and Mobile Computing Conference (IWCMC), Sep. 2016, IEEE, pp. 1033-1038.
Maletic, N., et al., "Device Localization Using mmWave Ranging with Sub-6-Assisted Angle of Arrival Estimation," 2018 IEEE International Symposium on Broadband Multimedia Systems and Broadcasting (BMSB), Jun. 2018, IEEE, 6 pages.
O'Toole, M., et al., "Confocal non-line-of-sight imaging based on the light-cone transform," Nature, vol. 555, No. 7696, Mar. 2018, Macmillan Publishers Limited, pp. 338-341.
Palacios, J., et al., "Communication-Driven Localization and Mapping for Millimeter Wave Networks," IEEE Conference on Computer Communications (IEEE INFOCOM 2018), Apr. 2018, IEEE, pp. 2402-2410.
Rappaport, T. S., et al., "Small-Scale, Local Area, and Transitional Millimeter Wave Propagation for 5G Communications," IEEE Transactions on Antennas and Propagation, vol. 65, No. 12, Dec. 2017, IEEE, pp. 6474-6490.
Setlur, P., et al., "Multipath Exploitation in Non-LOS Urban Synthetic Aperture Radar," IEEE Journal of Selected Topics in Signal Processing, vol. 8, No. 1, Feb. 2014, IEEE, pp. 137-152.
Shahmansoori, A., et al., "Position and Orientation Estimation Through Millimeter-Wave MIMO in 5G Systems," IEEE Transactions on Wireless Communications, vol. 17, No. 3, Mar. 2018, IEEE, pp. 1822-1835.
Sheen, D., et al., "Three-Dimensional Millimeter-Wave Imaging for Concealed Weapon Detection," IEEE Transactions on Microwave Theory and Techniques, vol. 49, No. 9, Sep. 2001, IEEE, pp. 1581-1592.
Sume, A., et al., "Radar Detection of Moving Targets Behind Corners," IEEE Transactions on Geoscience and Remote Sensing, vol. 49, No. 6, Jun. 2011, IEEE, pp. 2259-2267.
Thai, K., et al., "Around-the-Corner Radar: Detection and Localization of a Target in Non-Line of Sight," 2017 IEEE Radar Conference (RadarConf), May 2017, IEEE, pp. 0842-0847.
Trichopoulos, G. C., et al., "A Broadband Focal Plane Array Camera for Real-time THz Imaging Applications," IEEE Transactions on Antennas and Propagation, vol. 61, No. 4, Apr. 2013, IEEE, pp. 1733-1740.
Velten, A., et al., "Recovering three-dimensional shape around a corner using ultrafast time-of-flight imaging," Nature commmunications, vol. 3, Mar. 2012, Macmillan Publishers Limited, 8 pages.
Witrisal, K., et al., "High-Accuracy Localization for Assisted Living: 5G systems will turn multipath channels from foe to friend," IEEE Signal Processing Magazine, vol. 33, No. 2, Mar. 2016, IEEE, pp. 59-70.
Xu, F., et al., "Revealing hidden scenes by photon-efficient occlusion-based opportunistic active imaging," Optics Express, vol. 26, No. 8, Apr. 2018, Optical Society of America, pp. 9945-9962.
Zetik, R., et al., "Looking Behind a Corner Using Multipath-Exploiting UWB Radar," IEEE Transactions on Aerospace and Electronic Systems, vol. 51, No. 3, Jul. 2015, IEEE, pp. 1916-1926.
Palacios, J., et al., "Jade: Zero-Knowledge Device Localization and Environment Mapping for Millimeter Wave Systems," IEEE INFOCOM 2017—IEEE Conference on Computer Communications, May 1-4, 2017, Atlanta, GA, IEEE, 9 pages.
Reitmayr, G., et al., "Simultaneous Localization and Mapping for Augmented Reality," 2010 International Symposium on Ubiquitous Virtual Reality, Jul. 7-10, 2010, Gwangju, South Korea, IEEE, pp. 5-8.
Wang, H., et al., "A Parametric Formulation of the UTD Diffraction Coefficient for Real-Time Propagation Prediction Modeling," IEEE Antennas and Wireless Propagation Letters, vol. 4, Aug. 15, 2005, IEEE, pp. 253-257.
Wei, Z., et al., "DoA-LF: A Location Fingerprint Positioning Algorithm With Millimeter-Wave," IEEE Access, vol. 5, Sep. 18, 2017, IEEE, pp. 22678-22688.

* cited by examiner

Optical Image    Expected THz Image

MAPPING AND LOCALIZATION USING IMAGE PROCESSING OF WIRELESS SIGNALS

RELATED APPLICATIONS

This application claims the benefit of provisional patent application Ser. No. 62/767,820, filed Nov. 15, 2018, the disclosure of which is hereby incorporated herein by reference in its entirety.

FIELD OF THE DISCLOSURE

This application relates to mapping using wireless signals.

BACKGROUND

Simultaneous localization and mapping (SLAM) is the ability of a system (such as a base station, a robot, or a mobile device) to identify its environment, create a three-dimensional map, and acquire a current position (e.g., the position of the robot or mobile device in the environment). SLAM enables autonomous agents to navigate independently in a crowded environment while avoiding collisions with the surroundings and protecting humans from possible injury. Additionally, SLAM has found applications in virtual and augmented reality, autonomous driving, and assisted living technologies. SLAM can also be used for military applications, such as navigation in GPS challenged or denied regions, autonomous navigation in unstructured environments (indoor, outdoor, and subterranean), navigation for multiple devices even in non-line-of-sight situations, and accurate localization of devices or objects deep inside buildings.

A common requirement for most SLAM applications is providing the location of the user/device with high spatial accuracy. Spatial resolution is directly proportional to the wavelengths of utilized electromagnetic signals, therefore millimeter wave (mmWave) has become a promising spectrum for SLAM systems. Due to their short wavelength and large absolute bandwidths, mmWave signals promise a high spatial resolution.

One of the early works on SLAM in wireless network environment was done by using the WiFi Received Signal Strength Indicator (RSSI) from multiple access points (APs) and estimating the location of a mobile station (MS). Others extended SLAM into mmWave radio frequency (RF) networks by incorporating direction-of-arrival (DoA) and creating a fingerprinting database for possible locations. Sub-6 gigahertz (GHz) systems have been used concurrently with mmWave systems by estimating angle-of-arrival (AoA) from the sub-6 GHz system and feeding it to the mmWave system to simplify the beam training for ranging and localization. Algorithms leveraging angle-difference-of-arrival (ADoA) were developed by first estimating the position of access points then estimating the location of the user by comparing the ADoA from each AP to the user. However, those methods require at least 4 APs. At mmWave frequencies, localization algorithms for line-of-sight (LOS) and non-line-of-sight (NLOS) were developed. These solutions, however, are limited for only one reflection and require an antenna array at each device for localization.

Thanks to the hundreds to thousands of antennas that are expected to be deployed at mmWave base stations (BS), these BSs could also be used for mmWave imaging. Further, future communication systems "6G and beyond" will likely utilize even higher frequency bands. The higher bandwidth can be leveraged to provide even higher resolution images, thus increasing the accuracy of SLAM approaches.

SUMMARY

Mapping and localization using image processing of wireless signals is provided. Embodiments of the present disclosure provide a novel approach for high accuracy mapping of an environment around an antenna (or antenna array) coupled to a radio frequency (RF) transceiver through image processing of RF signals. The image processing includes constructing a map of line-of-sight (LOS) and non-line-of-sight (NLOS) objects in the environment by distinguishing NLOS objects and correctly projecting their positions relative to the LOS objects. In some examples, a three-dimensional (3D) image of the environment around the antenna (or antenna array) is produced.

Aspects disclosed herein can further provide simultaneous localization and mapping (SLAM) for a wireless device. After mapping the environment, uplink pilot signaling with the wireless device is used to estimate the angle-of-arrival (AoA) and time-of-arrival (ToA) of the dominant channel paths. By projecting the AoA and ToA information on the map of the environment, the proposed solution can locate the wireless device with a sub-centimeter accuracy.

This approach has several advantages. First, it allows accurate SLAM from a single standpoint (e.g., using only one antenna array). Second, it does not require any prior knowledge of the surrounding environment. Third, it can locate NLOS objects and wireless devices, even if their signals experience more than one reflection and without requiring an antenna array at the wireless device.

An exemplary embodiment provides method for mapping an environment. The method includes transmitting a plurality of RF signals in the environment. The method further includes receiving a response signal to the plurality of RF signals. The method further includes mapping the environment, comprising: mapping an LOS object based on a scattering of the plurality of RF signals indicated in the response signal; identifying an NLOS object from the response signal; and mapping the NLOS object using the mapped LOS object.

Another exemplary embodiment provides a mapping device. The mapping device includes an antenna and a transceiver configured to receive a response signal to a plurality of transmitted radio frequency (RF) signals via the antenna. The mapping device further includes a processing device configured to map an environment around the antenna by: mapping an LOS object based on a scattering of the plurality of transmitted RF signals indicated in the response signal; identifying an NLOS object from the response signal; and mapping the NLOS object using the mapped LOS object.

Another exemplary embodiment provides an imaging system. The imaging system includes a first antenna array and a processing device in communication with the first antenna array. The processing device is configured to receive a first response signal to a plurality of transmitted RF signals from the first antenna array. The processing device is further configured to map a first LOS object around the first antenna array based on a scattering of the plurality of transmitted RF signals indicated in the first response signal. The processing device is further configured to identify an NLOS object from the first response signal. The processing device is further configured to map the NLOS object using the mapped first LOS object to produce a map of an environment around the first antenna array.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Mapping and localization using image processing of wireless signals is provided. Embodiments of the present disclosure provide a novel approach for high accuracy mapping of an environment around an antenna (or antenna array) coupled to a radio frequency (RF) transceiver through image processing of RF signals. The image processing includes constructing a map of line-of-sight (LOS) and non-line-of-sight (NLOS) objects in the environment by distinguishing NLOS objects and correctly projecting their positions relative to the LOS objects. In some examples, a three-dimensional (3D) image of the environment around the antenna (or antenna array) is produced.

Aspects disclosed herein can further provide simultaneous localization and mapping (SLAM) for a wireless device. After mapping the environment, uplink pilot signaling with the wireless device is used to estimate the angle-of-arrival (AoA) and time-of-arrival (ToA) of the dominant channel paths. By projecting the AoA and ToA information on the map of the environment, the proposed solution can locate the wireless device with a sub-centimeter accuracy.

This approach has several advantages. First, it allows accurate SLAM from a single standpoint (e.g., using only one antenna array). Second, it does not require any prior knowledge of the surrounding environment. Third, it can locate NLOS objects and wireless devices, even if their signals experience more than one reflection and without requiring an antenna array at the wireless device.

Figure 1A:
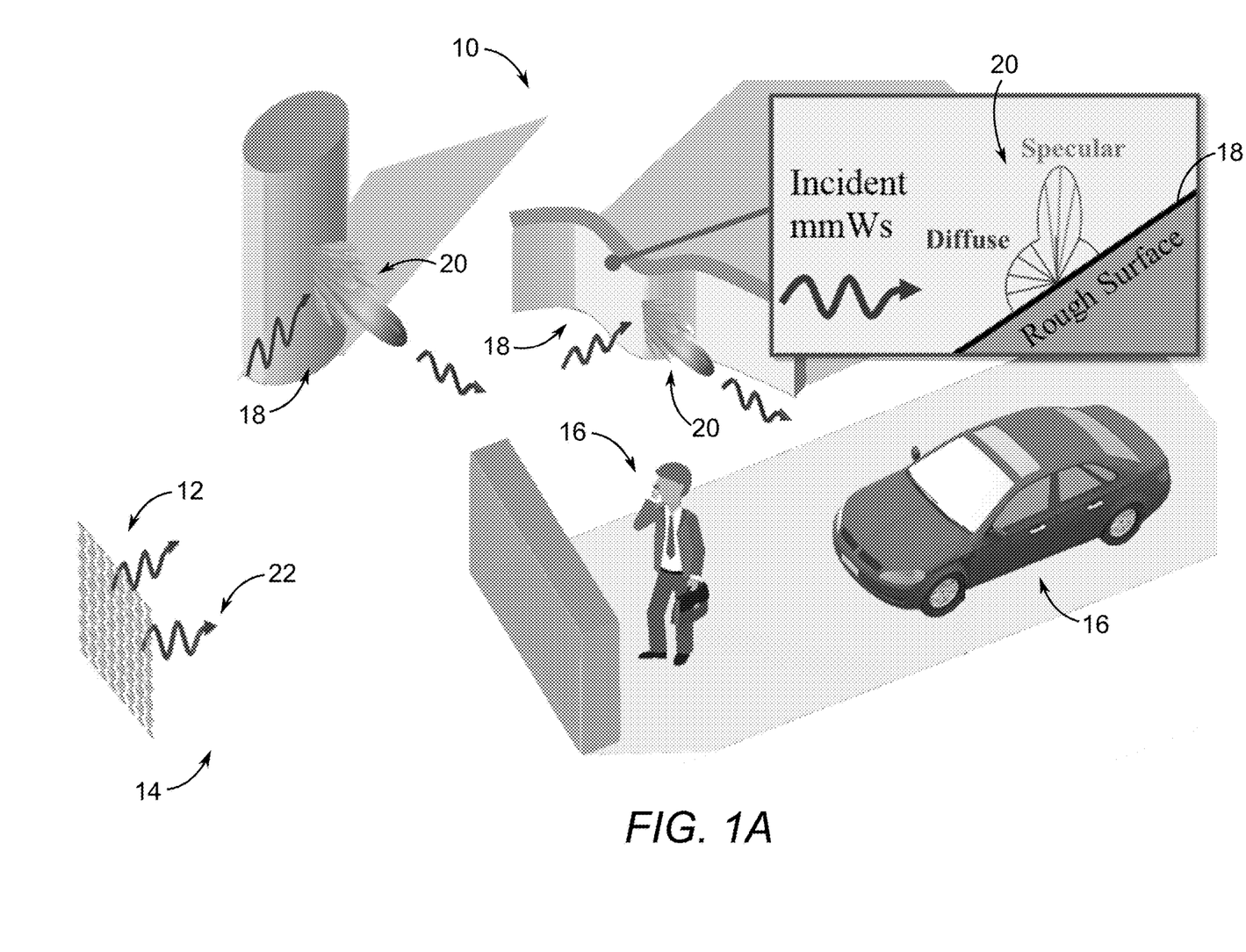
FIG. 1A is a schematic diagram of an environment around an antenna array for an imaging system according to embodiments of the present disclosure.

FIG. 1A is a schematic diagram of an environment 10 around an antenna array 12 for an imaging system 14 according to embodiments of the present disclosure. The imaging system 14 includes a mapping device (which may be implemented in a computer system, such as described further below with respect to FIG. 9) coupled to the antenna array 12 which uses image processing to provide a map of the environment 10 for SLAM. SLAM for a wireless device 16 (e.g., a cellular phone, a tablet, a computer, an automobile, etc.) may be provided in a process including three steps: i) RF imaging of the surrounding geometry (e.g., using millimeter waves (mmWaves)) to provide a map of the environment 10, ii) recording of AoA and ToA of one or more signals from the wireless device 16 using a wideband pilot signal, and iii) fusion of the map, AoA, and ToA to determine the location of the wireless device 16.

One of the key enablers in this approach is the ability of the imaging system 14 to provide images for NLOS areas, including NLOS areas seen through multiple reflections, without requiring a priori knowledge of the geometry of the environment 10. In this regard, many surfaces 18 in the environment 10 (e.g., building surfaces and surfaces of other solid objects) exhibit roughness comparable to wavelengths of certain electromagnetic waves (e.g., mmWaves), resulting in scattering features 20 having both specular and diffuse components, as illustrated inset in FIG. 1A. Thus, in an exemplary aspect the antenna array 12 transmits and receives RF signals in the mmWave band, which may be defined as frequencies between 30 gigahertz (GHz) and 10 terahertz (THz). In some examples, the antenna array 12 transmits and receives RF signals having frequencies between 70 GHz and 1 THz.

Embodiments described herein use the antenna array 12 (and additional antenna arrays in some examples) to acquire 3D image data of the environment 10 using a broadband active imaging system that illuminates an object and records backscattered RF signals 22. Thus, the antenna array 12 transmits a plurality of RF signals 22 (e.g., a broadband transmission) in the environment 10 and receives a response signal (which may include a number of response signals across the transmitted spectrum) which includes information from the backscattered RF signals 22.

The topology of the imaging system 14 can be either quasi-optical (e.g., using lenses and mirrors) or lensless. Image formation in optical systems is typically straightforward; however, for high angular resolution, imaging systems become bulky and heavy. Lensless imaging systems require phase locking between the transceivers and computationally intense image reconstruction algorithms, but such systems can be low-profile and easily embedded in various surface topologies (e.g. walls, vehicles). An example of a lensless imaging system is a planar uniform array of isotropic antennas (e.g., antenna array 12) connected to transceivers operating on a wide frequency bandwidth. Using holographic imaging the obtained 3D image is:

$$f(x, y, z) = IFT_{3D}\left\{FT_{2D}\{R(x, y, f)\}e^{-j\sqrt{4k^2 - k_x^2 - k_y^2}\,z}\right\}$$ Equation 1

Where f(x, y, x) is the reflectivity function (e.g., image) of the environment in cartesian coordinates, FT and IFT denote the discrete spatial Fourier and inverse Fourier transforms. Further, R(x, y, f) is the scattered signal over a given range of frequencies f collected at each (x, y) antenna position, k is the wave number, and $k_x$ and $k_y$ represent the spatial frequency of x and y. Alternatively, other image reconstruction methods can be applied, including multistatic holography (or range migration method), compressive holography, machine learning, and beam scanning.

Imaging can also be performed by using the same hardware as a wireless communication system. For example, the antenna array 12 can be implemented in a base station (BS), and the bandwidth of a wireless channel in the wireless communication system could provide the necessary spatial resolution for accurate 3D imaging. Image reconstruction methods and image quality will depend on the architecture of the BS antenna array 12 (e.g., analog, digital, or hybrid phased array). Embodiments may be described below with respect to two-dimensional (2D) images. It should be understood that such 2D images are used for illustrative purposes.

Figure 1B:
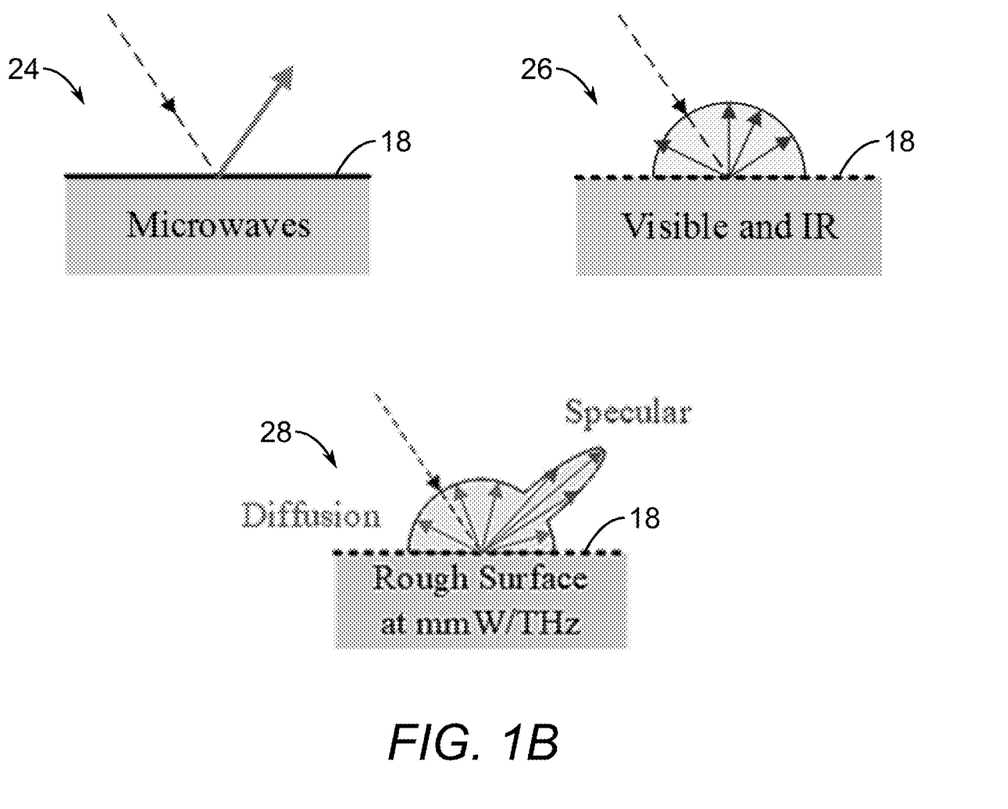
FIG. 1B is a schematic diagram of wave scattering at a surface in the environment of FIG. 1 for different wavelengths of the electromagnetic spectrum.

FIG. 1B is a schematic diagram of wave scattering at a surface 18 in the environment 10 of FIG. 1 for different wavelengths of the electromagnetic spectrum. Due to the roughness of the surface 18, higher-frequency electromagnetic waves 24, such as microwaves, experience specular reflection from the surface 18, making the higher-frequency electromagnetic waves 24 unusable for imaging the surface 18. Lower-frequency electromagnetic waves 26, such as visible and infrared light, experience diffuse reflection from the surface 18, which allows for imaging LOS surfaces 18 but not NLOS surfaces 18. However, because the roughness of the surface 18 is comparable to mmWaves 28, the mmWaves 28 reflect with both specular and diffuse components, which allows for imaging both LOS surfaces 18 (e.g., through the diffuse components) and NLOS surfaces 18 (through the specular components).

Figure 1C:
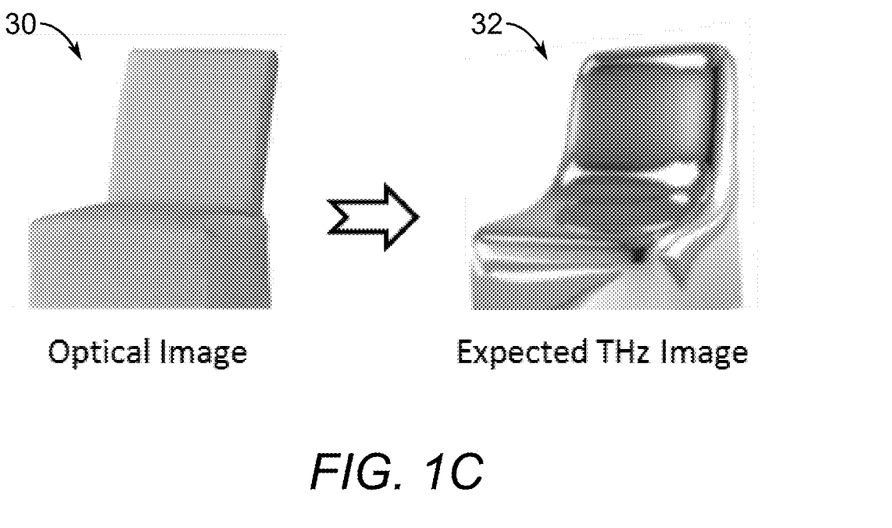
FIG. 1C graphically illustrates an appearance of an object in the environment of FIG. 1A at optical and millimeter wave (mmWave) frequencies.

FIG. 1C graphically illustrates an appearance of an object in the environment 10 of FIG. 1A at optical and mmWave frequencies. FIG. 1C provides an analogy of the specular and diffuse reflection of the object for mmWaves. As illustrated, an optical image 30 of the object has only diffuse reflections, giving a solid appearance. However, a 1 THz image 32 of the object has diffuse and specular reflections, giving a quasi-mirrored appearance which allows for imaging the object and NLOS objects mirrored from its surface.

Figure 2A:
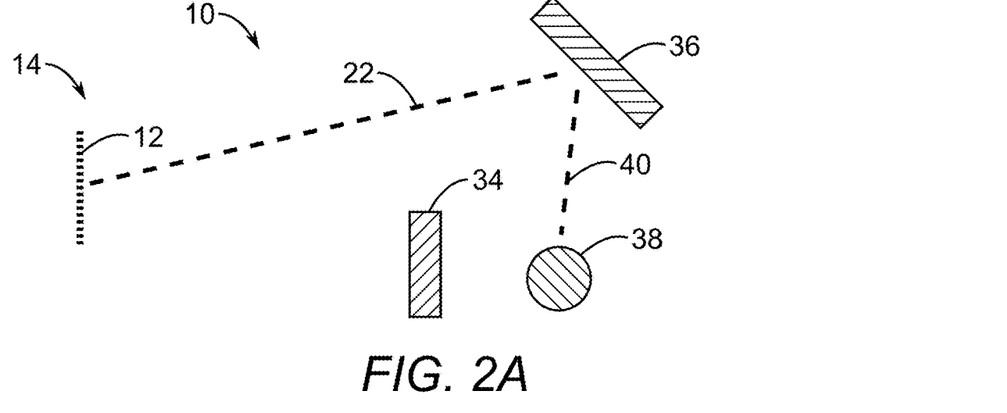
FIG. 2A is a schematic diagram of another environment around the antenna array of FIG. 1A having two line-of-sight (LOS) objects and a non-line-of-sight (NLOS) object.
Figure 2B:
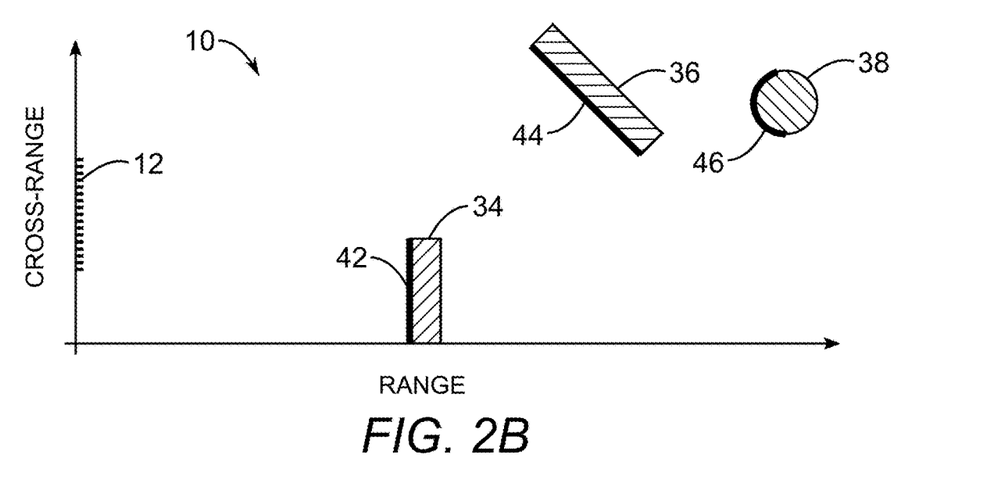
FIG. 2B is a schematic diagram illustrating a raw radio frequency (RF) response signal of the environment of FIG. 2A in which the NLOS object appears behind an LOS object.
Figure 2C:
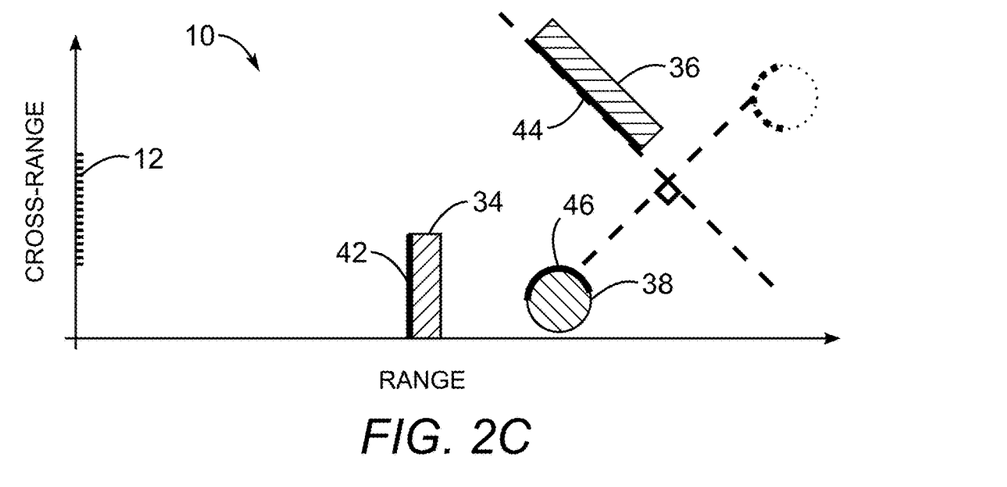
FIG. 2C is a schematic diagram illustrating a corrected mapping of the environment of FIG. 2A from the RF response signal of FIG. 2B.

FIGS. 2A-2C illustrate an image processing approach for mapping the environment 10 of FIG. 1A. The 3D images acquired using mmWave radar imaging may not represent the actual geometry of the environment 10 due to multiple bounces of the mmWaves. As such, the radar images contain information for both LOS and NLOS objects, and proper image correction is needed.

In this regard, FIG. 2A is a schematic diagram of another environment 10 around the antenna array 12 of FIG. 1A having two LOS objects 34, 36 and an NLOS object 38. The NLOS object 38 is behind a first LOS object 34, which would make it unviewable for infrared or visible light imaging systems. However, RF signals 22 in the mmWave spectrum transmitted from the antenna array 12 can be reflected 40 from a second LOS object 36, making it visible to the imaging system 14.

FIG. 2B is a schematic diagram illustrating a raw RF response signal of the environment 10 of FIG. 2A in which the NLOS object 38 appears behind the second LOS object 36. The raw RF response signal includes information from a first surface 42 of the first LOS object 34, a second surface 44 of the second LOS object 36, and a third surface 46 of the NLOS object 38. Due to specular reflection from the second surface 44, the NLOS object 38 appears behind the second LOS object 36, rather than its true position behind the first LOS object 34.

Embodiments apply a correction algorithm of raw radar images (e.g., the RF response signal) using mirroring techniques. The algorithm is based on the assumption that objects are opaque at mmWaves, therefore any object that appears behind a surface on the radar images is considered an artifact and needs to be corrected (e.g., the NLOS object 38 in FIG. 2B). The first step of the algorithm is to identify objects behind the LOS objects 34, 36 and mark them for correction. Here, the NLOS object 38 needs correction.

FIG. 2C is a schematic diagram illustrating a corrected mapping of the environment 10 of FIG. 2A from the RF response signal of FIG. 2B. Every LOS surface 42, 44 is assumed a mirror surface and every obstructed pixel is mirrored around that surface, such that the NLOS object 38 is mirrored from the second surface 44. If the LOS surface 42, 44 is curved, then it is discretized into planar segments and the process is repeated accordingly for every segment. Diffraction at the edges of the surfaces 42, 44, 46 can be assumed to be on the same level as diffuse scattering and is not treated separately. In this manner, a mapping of the environment 10 is produced.

Figure 3:
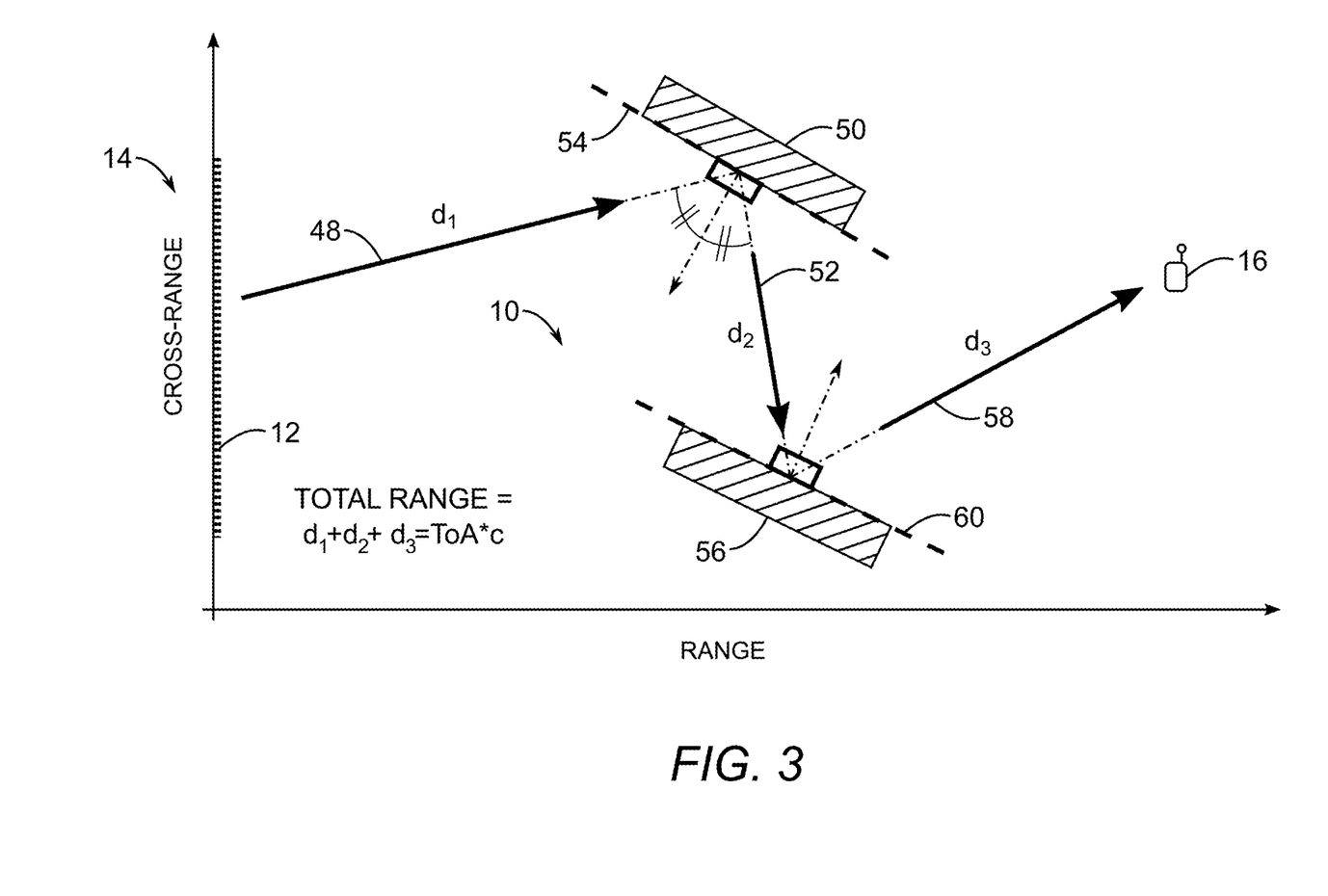
FIG. 3 is a schematic diagram of another environment around the antenna array of FIG. 1A, illustrating ray casting to locate a wireless device in a map of the environment.

FIG. 3 is a schematic diagram of another environment 10 around the antenna array 12 of FIG. 1A, illustrating ray casting to locate a wireless device 16 in a map of the environment 10. SLAM can be provided through the mapping approach illustrated in FIGS. 2A-2C and the localization approach for the wireless device 16 illustrated in FIG. 3. To locate the wireless device 16, this approach first estimates the AoA and ToA of the dominant paths of the channel between the antenna array 12 and the wireless device 16. Then, leveraging knowledge of the geometry of the environment 10, the estimated AoA and ToA are projected on the acquired 3D image (e.g., map) to localize the wireless device 16.

There are several possible techniques for estimating the AoA and ToA of the wireless device 16. The proposed SLAM method is general and does not depend on the specific AoA/ToA estimation techniques. In an exemplary aspect, the AoA/ToA estimation uses an uplink pilot from the wireless device 16. In this regard, the antenna array 12 can be considered as a uniform linear antenna array (ULA) with N elements placed along the cross-range axis, with uniform λ/2 spacing. In some examples, it can be assumed that only one path exists for the channel between the wireless device 16 and the antenna array 12. This path can be either a LOS or NLOS path. If the wireless device 16 transmitted an uplink pilot signal $s_p(f)$ at frequency f, then the received signal at the antenna array 12 can be expressed as $$y(f)=\alpha_u s_p(f) a(\theta_u) \quad \text{Equation 2}$$

where $\alpha_u$ and $\theta_u$ are the complex gain and AoA of the channel path between the antenna array 12 and the wireless device 16. Further, the array response vector of this AoA is defined as $a(\theta_u)=[1, e^{jkd\cos(\theta_u)}, \ldots, e^{jkd(N-1)\cos(\theta_u)}]^T$.

From the response signal received at the antenna array 12, a joint search over the angles of arrival and ranges is performed to estimate the AoA and ToA (or equivalently the range) of the wireless device 16. For this, the received signal y(f) is combined by a steering vector w(θ) with sweeping over the steering angle θ. The combined received signal at frequency f and steering angle θ can then be written as:

$$y_c(\theta,f)=w(\theta)^T y(f) \quad \text{Equation 3}$$

To transform this combined received signal to the range domain, the inverse spatial Fourier transform is applied:

$$y_c(\theta,r)=\text{IFT}\{y_c(\theta,f)e^{-jkr}\} \quad \text{Equation 4}$$

By scanning this received combined signal $y_c(\theta,r)$ over all the angle/range points, the AoA, $\hat{\theta}_u$, and range, $\hat{r}_u$ (or equivalently the ToA, $\hat{T}_u$) of the wireless device 16 are estimated. Note that when the wireless device 16 is in NLOS, the range $\hat{r}_u$ does not represent the actual distance of the wireless device 16 from the center of the antenna array 12, but rather the total travelling distance from the wireless device 16 to the antenna array 12 through the (multiple) reflections.

The 3D image (e.g., map) of the environment 10 is combined with the estimated AoA and ToA to find the location of the antenna array 12 with respect to the environment 10. The physical center of the antenna array 12 is used as a reference point for the AoA and ToA. Namely, a first ray 48 is launched from the center of the antenna array 12 at an angle equal to the estimated AoA $\hat{\theta}_u$. For an LOS wireless device 16, the length of the first ray 48 will be equal to $\hat{r}_u = \hat{T}_u c$, where c is the speed of light and the wireless device 16 will be located at the end of the first ray 48 path. If the wireless device 16 is in NLOS, then the first ray 48 will intersect a first mirror object 50 at a distance less than $\hat{r}_u$. Then, a second ray 52 is launched from the intersected point at the specular angle with respect to a first mirror surface 54. This is repeated for multiple bounces (e.g., for a second mirror object 56, launching a third ray 58 from a second mirror surface 60) until the total length of all the rays 48, 52, 58 is equal to $\hat{r}_u$. The end of the ray path is then the location of the wireless device 16. The accuracy of the proposed algorithm will depend on the fidelity of the 3D images and accuracy of the estimated AoA/ToA. Both steps depend on the (i) operating frequency, (ii) bandwidth, and (iii) antenna array 12 aperture.

Figure 4:
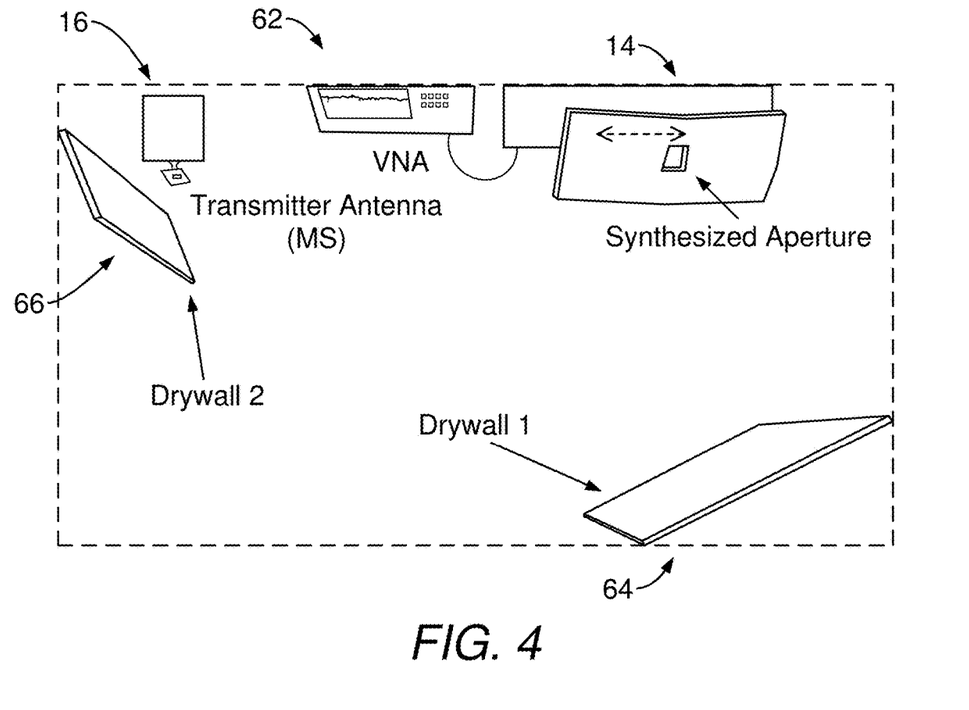
FIG. 4 illustrates an exemplary experimental environment demonstrating the proposed approach for mapping the environment.

FIG. 4 illustrates an exemplary experimental environment 62 demonstrating the proposed approach for mapping the environment. The experimental environment 62 is a 2D mock-up environment used for evaluating the proposed SLAM approach described above with respect to FIGS. 2A-3. The imaging system 14 in this example is implemented with a synthetic aperture radar (SAR) to emulate the imaging performance of the antenna array 12 of FIG. 1. As such, the SLAM problem is limited to two dimensions (range and crossrange). The experimental environment 62 is comprised of a LOS wall 64 (e.g., Drywall 1) and an NLOS wall 66 (e.g., Drywall 2). A wireless device 16 (e.g., Transmitter Antenna or User) is placed close to the NLOS wall 66 and is also in NLOS with respect to the imaging system 14.

The imaging system 14 is implemented as a monostatic SAR using two Vector Network Analyzer (VNA) extenders (TxRx and Rx) that are coupled to diagonal horn antennas. The extenders are mounted on a high precision motorized translation stage to scan a 13 centimeter (cm) long aperture. The imaging system 14 is computer controlled and records a scattering parameter $S_{21}$ at 5,000 frequency points in the 220-330 GHz range to ensure unambiguous range imaging. Subsequently, the TxRx extender is placed close to the NLOS wall 66 (e.g., Drywall 2) and is used for the emulation of the wireless device 16 pilot transmission. By applying beam forming on the recorded $S_{21}$ parameters, the AoA of the wireless device 16 is determined. A Fourier transform is applied on the multi-frequency signal to estimate the ToA.

Figure 5:
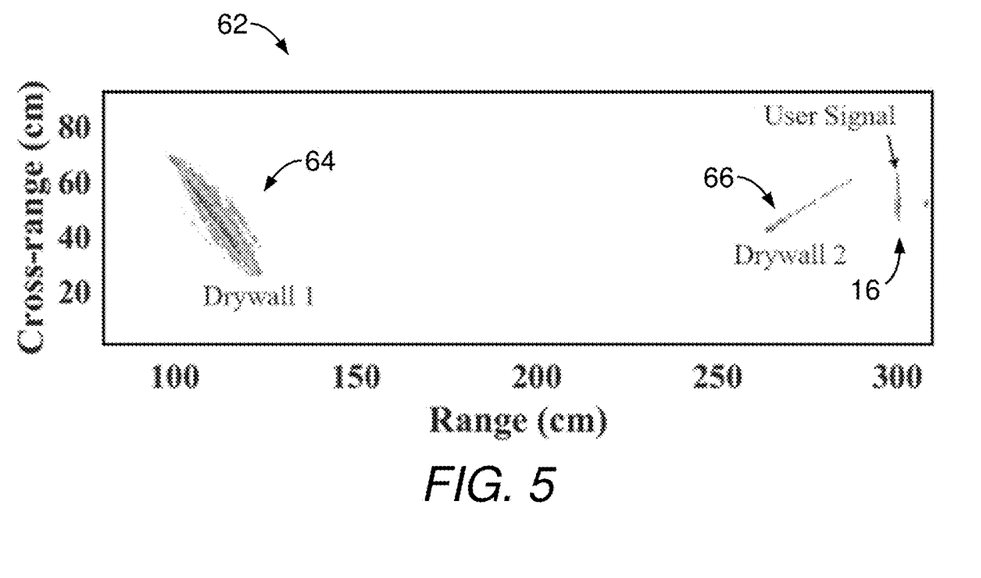
FIG. 5 illustrates a two-dimensional (2D) image of the experimental environment of FIG. 4.

FIG. 5 illustrates a 2D image of the experimental environment 62 of FIG. 4. Holographic image reconstruction (e.g., a range migration algorithm (RMA) or other appropriate technique) is used for image reconstruction, and the AoA/ToA data is superimposed on the reconstructed 2D map. The wireless device 16 in FIG. 5 has a 23 decibel isotropic (dBi) gain diagonal horn antenna.

The NLOS wall 66 (e.g., Drywall 2) appears incorrectly behind the LOS wall 64 (e.g., Drywall 1) due to multiple reflections of the transmitted RF signals (e.g., mmWaves). Similarly, the wireless device 16 with the horn antenna appears displaced with respect to the imaging system 14.

Figure 6:
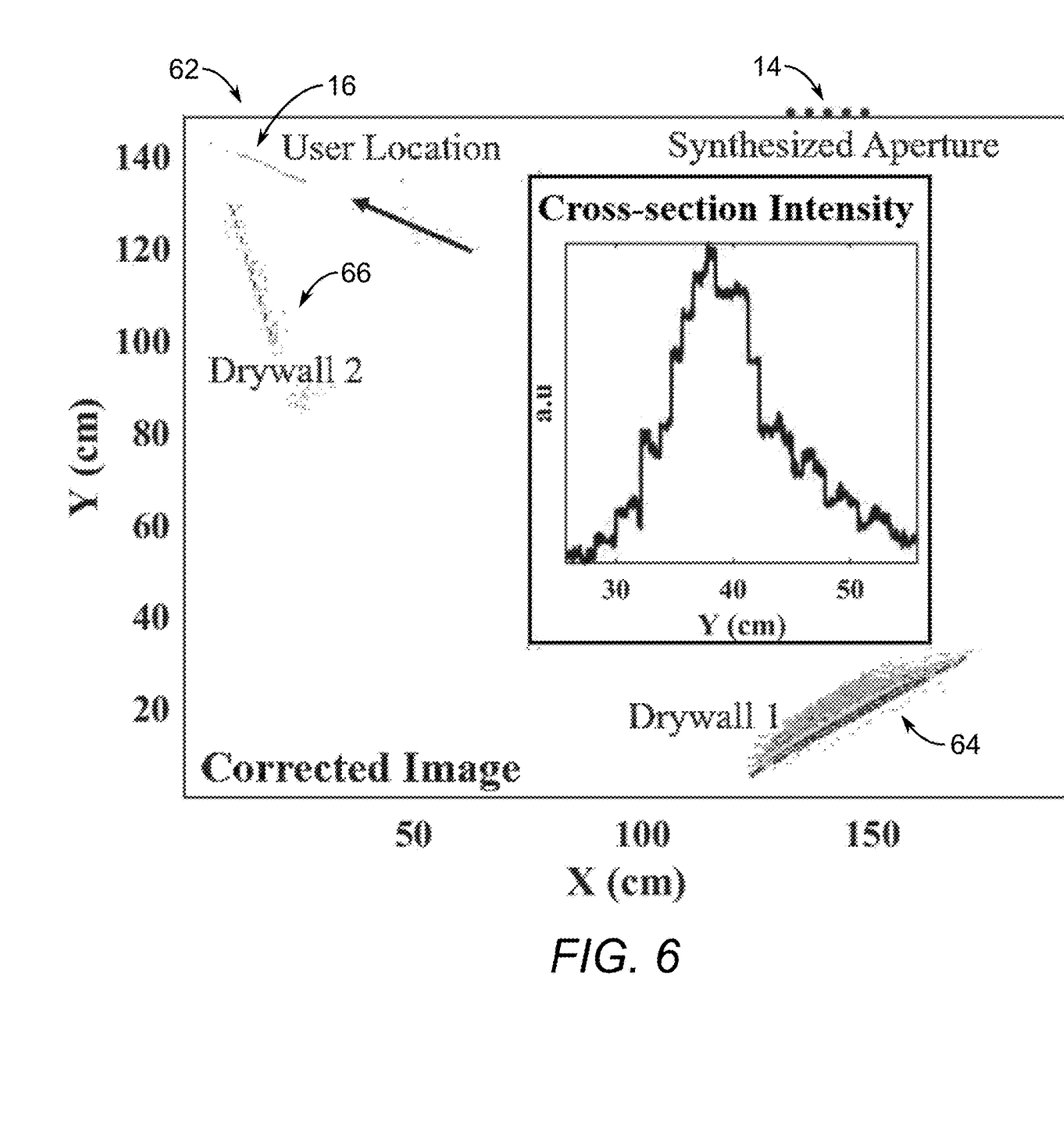
FIG. 6 illustrates a corrected 2D image of the experimental environment FIGS. 4 and 5.

FIG. 6 illustrates a corrected 2D image of the experimental environment 62 of FIGS. 4 and 5. To correct the environment 62 geometry and wireless device 16 location, mirroring was applied for every surface (e.g., the LOS wall 64 then the NLOS wall 66) successively. In the corrected image, the LOS wall 64, the NLOS wall 66, and the NLOS wireless device 16 are reconstructed with very good agreement to the actual geometry of FIG. 4. Using an off-the-shelf laser distance meter, several points in the experimental environment 62 were sampled and agreement was found within the accuracy of the measurement device (<1 cm).

Nevertheless, it should be noted in the raw image of FIG. 5, the wireless device 16 signal appears as a smeared trace, rather than a sharp point on the map. As illustrated in the inset of FIG. 6, the signal exhibits a clear single lobe shape in the cross-range with a half-power beamwidth (HPBW) of around 5 cm at about 3 meters (m) distance from the imaging system 14 due to the surface roughness of the walls 64, 66 and the antenna array size. However, along the range direction the HPBW is less than 6 millimeters (mm) due to the large signal bandwidth (100 GHz). Finally, the location of the wireless device 16 signal in FIG. 5 depends on the relative pose of the horn antenna with respect to the NLOS wall 66 (e.g., Drywall 2). Were the horn antenna not facing the NLOS wall 66 within an appropriate range of angles, no wireless device 16 signal would be received on the antenna array of the imaging system 14.

Figure 7:
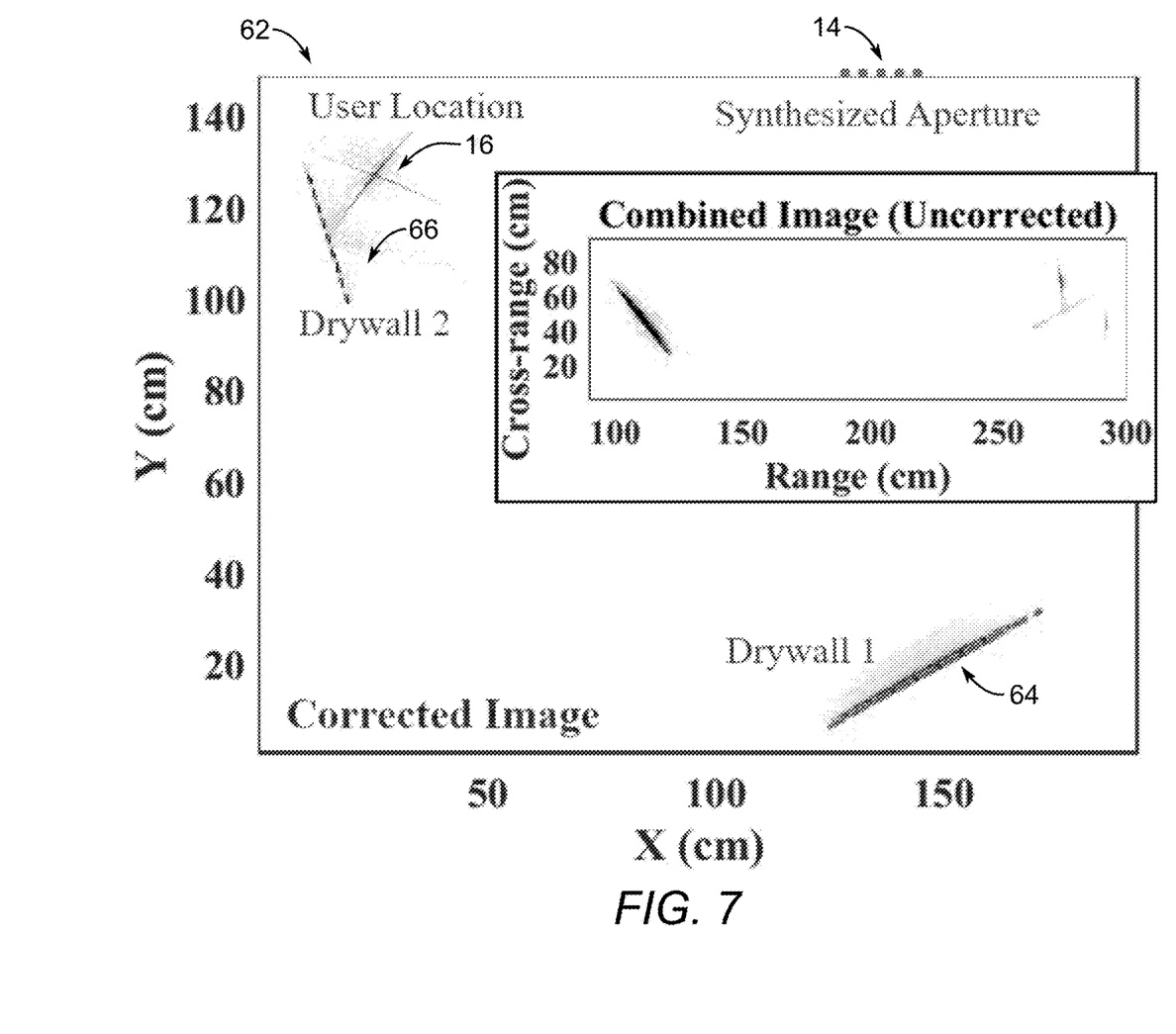
FIG. 7 illustrates simultaneous mapping of the experimental environment of FIG. 4 and localization of a wireless device having an omnidirectional antenna.

FIG. 7 illustrates simultaneous mapping of the experimental environment 62 of FIG. 4 and localization of a wireless device 16 having an omnidirectional antenna. In this example, the measurement is repeated using an open waveguide, thus emulating a 180-degree omnidirectional antenna. After reconstructing the 2D raw image and superimposing the AoA/ToA, the wireless device 16 appears in two locations in the inset of FIG. 7. This is due to the fact that the omnidirectional antenna illuminates simultaneously both walls 64, 66. The antenna array of the imaging system 14 receives a first signal from the wireless device 16 after a single bounce from the LOS wall 64 (e.g., Drywall 1) and a second signal after two bounces from the NLOS wall 66 (e.g., Drywall 2) and the LOS wall 66.

Although the signals originate from the same source, the signals appear at different angles and distances that correspond to the multipath propagation of the SAR used for the imaging system 14. Following the image correction method described above, the correct 2D map and wireless device 16 location are acquired. Interestingly, the omnidirectional wireless device 16 location is now determined by cross-section of two traces. Because the traces are very narrow in the range direction (<6 mm), sub-centimeter accuracy is achieved in wireless device 16 localization when multiple propagation is present.

Figure 8:
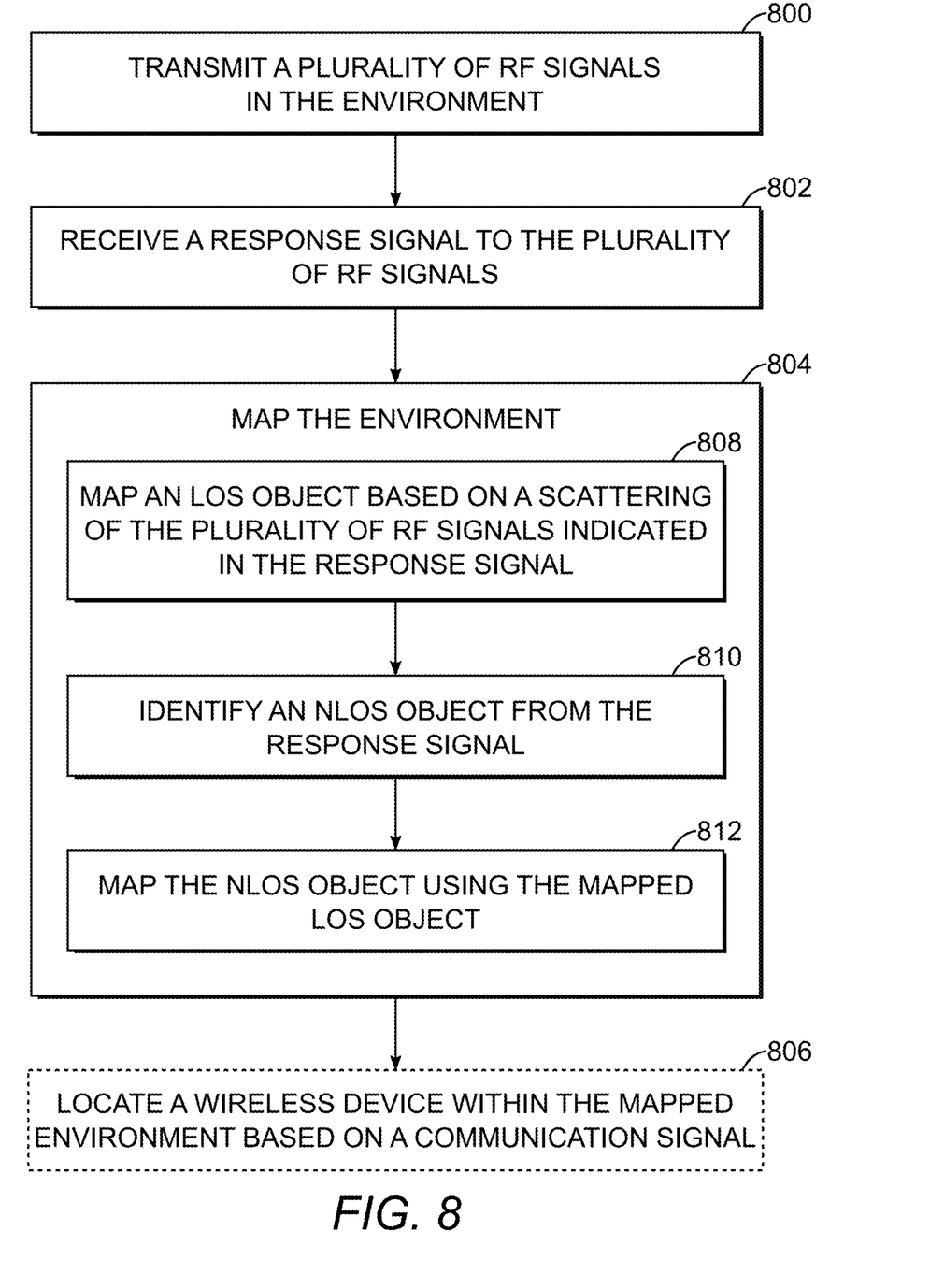
FIG. 8 is a flow diagram illustrating a process for mapping an environment.

FIG. 8 is a flow diagram illustrating a process for mapping an environment. Dashed boxes represent optional steps. The process begins at operation 800, with transmitting a plurality of RF signals in the environment. The process continues at operation 802, with receiving a response signal to the plurality of RF signals. In an exemplary aspect, an antenna array is used to transmit and receive RF signals in the mmWave spectrum. The process continues at operation 804, with mapping the environment.

The process may optionally continue at operation 806, with locating a wireless device within the mapped environment based on a communication signal (e.g., a communication signal received from the device). For example, after mapping the environment, uplink pilot signaling with the wireless device can be used to estimate the AoA and ToA of the dominant channel paths. By projecting the AoA and ToA information on the map of the environment, the proposed solution can locate the wireless device with a sub-centimeter accuracy. In some examples, the process of FIG. 8 includes simultaneous mapping and localization of one or more wireless devices or other objects in the environment.

In greater detail, operation 804 includes sub-operation 808, with mapping an LOS object based on a scattering of the plurality of RF signals indicated in the response signal. Operation 804 continues at sub-operation 810, with identifying an NLOS object from the response signal. Operation 804 continues at sub-operation 812, with mapping the NLOS object using the mapped LOS object.

Although the operations of FIG. 8 are illustrated in a series, this is for illustrative purposes and the operations are not necessarily order dependent. Some operations may be performed in a different order than that presented. For example, operations 804 and 806 may be performed simultaneously. Further, processes within the scope of this disclosure may include fewer or more steps than those illustrated in FIG. 8.

Figure 9:
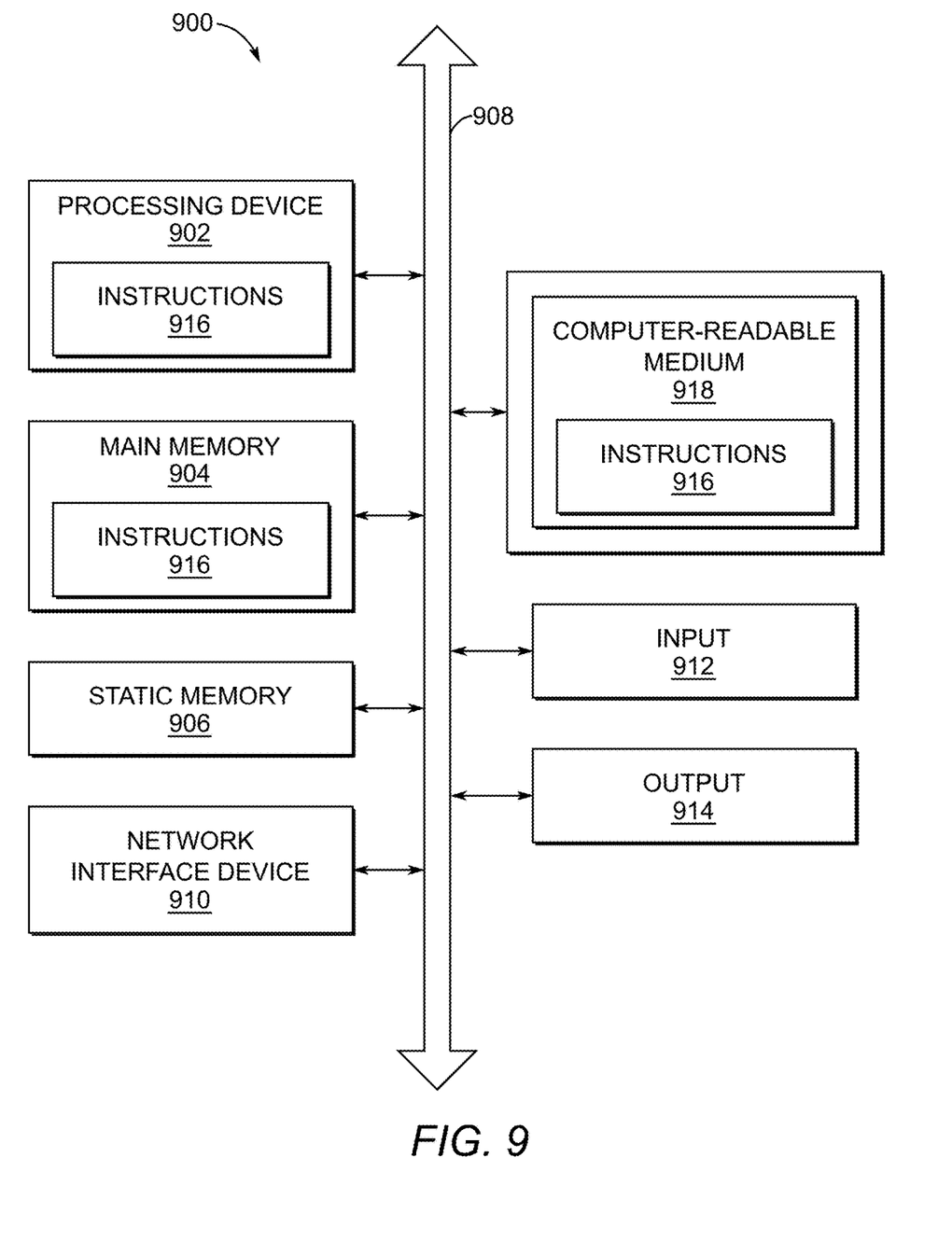
FIG. 9 is a schematic diagram of a generalized representation of an exemplary computer system that could be used to perform any of the methods or functions described above, such as mapping an environment.

FIG. 9 is a schematic diagram of a generalized representation of an exemplary computer system 900 that could be used to perform any of the methods or functions described above, such as mapping an environment. In some examples, the imaging system 14 and/or the mapping device of FIG. 1 are implemented as the computer system 900. In this regard, the computer system 900 may be a circuit or circuits included in an electronic board card, such as, a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 900 in this embodiment includes a processing device 902 or processor, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. Alternatively, the processing device 902 may be connected to the main memory 904 and/or static memory 906 directly or via some other connectivity means. In an exemplary aspect, the processing device 902 could be used to perform any of the methods or functions described above.

The processing device 902 represents one or more general-purpose processing devices, such as a microprocessor, central processing unit (CPU), or the like. More particularly, the processing device 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 902 is configured to execute processing logic in instructions for performing the operations and steps discussed herein.

The various illustrative logical blocks, modules, and circuits described in connection with the embodiments disclosed herein may be implemented or performed with the processing device 902, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 902 may be a microprocessor, or may be any conventional processor, controller, microcontroller, or state machine. The processing device 902 may also be implemented as a combination of computing devices (e.g., a combination of a DSP and a microprocessor, a plurality of microprocessors, one or more microprocessors in conjunction with a DSP core, or any other such configuration).

The computer system 900 may further include a network interface device 910. The computer system 900 also may or may not include an input 912, configured to receive input and selections to be communicated to the computer system 900 when executing instructions. The input 912 may include, but not be limited to, a touch sensor (e.g., a touch display), an alphanumeric input device (e.g., a keyboard), and/or a cursor control device (e.g., a mouse). In an exemplary aspect, the antenna array 12 of FIG. 1 is an input 912 to the computer system 900. The computer system 900 also may or may not include an output 914, including but not limited to a display, a video display unit (e.g., a liquid crystal display (LCD) or a cathode ray tube (CRT)), or a printer. In some examples, some or all inputs 912 and outputs 914 may be combination input/output devices. In an exemplary aspect, the antenna array 12 of FIG. 1 is also an output 914 of the computer system 900.

The computer system 900 may or may not include a data storage device that includes instructions 916 stored in a computer-readable medium 918. The instructions 916 may also reside, completely or at least partially, within the main memory 904 and/or within the processing device 902 during execution thereof by the computer system 900, the main memory 904, and the processing device 902 also constituting computer-readable medium. The instructions 916 may further be transmitted or received via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions 916. The term "computer-readable medium" shall also be taken to include any medium that is capable of storing, encoding, or carrying a set of instructions for execution by the processing device 902 and that causes the processing device 902 to perform any one or more of the methodologies of the embodiments disclosed herein. The term "computer-readable medium" shall accordingly be taken to include, but not be limited to, solid-state memories, optical medium, and magnetic medium.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

Those skilled in the art will recognize improvements and modifications to the preferred embodiments of the present disclosure. All such improvements and modifications are considered within the scope of the concepts disclosed herein and the claims that follow.

What is claimed is:

1. A method for mapping an environment, the method comprising:
   transmitting a plurality of radio frequency (RF) signals in the environment;
   receiving, at an antenna, an RF response to the plurality of RF signals; and
   mapping the environment, comprising:
   initially mapping a plurality of objects comprising a line-of-sight (LOS) object and a non-line-of-sight (NLOS) object in the environment based on a scattering of the plurality of RF signals indicated in the RF response, wherein the LOS object is within direct LOS of the antenna and the NLOS object is not within the direct LOS of the antenna;
   identifying the NLOS object from the RF response; and
   remapping the NLOS object based on relative positioning of the LOS object, the NLOS object, and the antenna receiving the RF response.

2. The method of claim 1, wherein the mapping of the environment comprises producing a three-dimensional (3D) image of the LOS object and the NLOS object.

3. The method of claim 1, wherein the mapping of the environment further comprises identifying a plurality of LOS objects comprising the LOS object and a plurality of NLOS objects comprising the NLOS object.

4. The method of claim 1, wherein:
   the plurality of RF signals are transmitted from an antenna array; and
   the RF response is received over the antenna array.

5. The method of claim 4, wherein identifying the LOS object and the NLOS object of the plurality of objects comprises:
   the identifying the LOS object having a surface within a line of sight of the antenna array; and
   the identifying the NLOS object being positioned out of the line of sight of the antenna array.

6. The method of claim 5, wherein the mapping of the NLOS object comprises ray tracing from the surface of the LOS object to project a location of the NLOS object.

7. The method of claim 1, further comprising:
   determining a position of a reflective surface which causes primarily specular reflection of the plurality of RF signals; and
   correcting the mapping of the environment to account for the position of the reflective surface.

8. The method of claim 7, wherein the position of the reflective surface is determined through a machine learning algorithm.

9. The method of claim 1, wherein each of the plurality of RF signals has a frequency between 30 gigahertz (GHz) and 10 terahertz (THz).

10. The method of claim 1, wherein each of the plurality of RF signals has a frequency between 70 gigahertz (GHz) and 1 terahertz (THz).

11. The method of claim 1, further comprising receiving sensor data from at least one of an infrared sensor, an optical sensor, or a camera;
   wherein the mapping of the environment is further based on the sensor data.

12. The method of claim 1, further comprising:
   receiving a communication signal from a device; and
   locating the device within the mapped environment based on the communication signal.

13. A mapping device, comprising:
   an antenna;
   a transceiver configured to receive a radio frequency (RF) response to a plurality of transmitted RF signals via the antenna; and
   a processing device configured to map an environment around the antenna by:

initially mapping a plurality of objects comprising a line-of-sight (LOS) object and a non-line-of-sight (NLOS) object in the environment based on a scattering of the plurality of transmitted RF signals indicated in the RF response, wherein the LOS object is within direct LOS of the antenna and the NLOS object is not within the direct LOS of the antenna;

identifying the NLOS object from the RF response; and remapping the NLOS object based on relative positioning of the LOS object, the NLOS object, and the antenna.

14. The mapping device of claim 13, wherein the antenna comprises an antenna array.

15. The mapping device of claim 13, wherein the processing device is further configured to map the environment around the antenna by producing a three-dimensional (3D) image of the LOS object, the NLOS object, and additional objects in the environment.

16. The mapping device of claim 13, wherein:

the transceiver comprises a millimeter wave (mmWave) transceiver;

the transceiver is further configured to receive a communication signal from an RF device; and the processing device is further configured to locate the RF device within the map of the environment from the communication signal.

17. An imaging system, comprising:

a first antenna array; and a processing device in communication with the first antenna array, the processing device configured to:

receive a first radio frequency (RF) response to a plurality of transmitted RF signals from the first antenna array;

initially map a plurality of objects comprising a first line-of-sight (LOS) object and a non-line-of-sight (NLOS) object around the first antenna array based on a scattering of the plurality of transmitted RF signals indicated in the first RF response, wherein the LOS object is within direct LOS of the first antenna array and the NLOS object is not within the direct LOS of the first antenna array;

identify the NLOS object from the first RF response; and remap the NLOS object based on relative positioning of the first LOS object, the NLOS object, and the first antenna array to produce a map of an environment around the first antenna array.

18. The imaging system of claim 17, further comprising a second antenna array in communication with the processing device.

19. The imaging system of claim 18, wherein the processing device is further configured to:

receive a second RF response from the second antenna array;

map a second LOS object around the second antenna array from the second RF response, wherein the second LOS object is within direct LOS of the second antenna array; and map the NLOS object further using the mapped second LOS object.

20. The imaging system of claim 17, wherein the processing device is further configured to remap the NLOS object by ray tracing from a surface of the LOS object to project a location of the NLOS object.

* * * * *